Jan. 10, 1956  A. E. PHILLIPS  2,730,463
ATOMIZING BONDERIZING OF CEMENT LINED TANK
Filed June 24, 1953
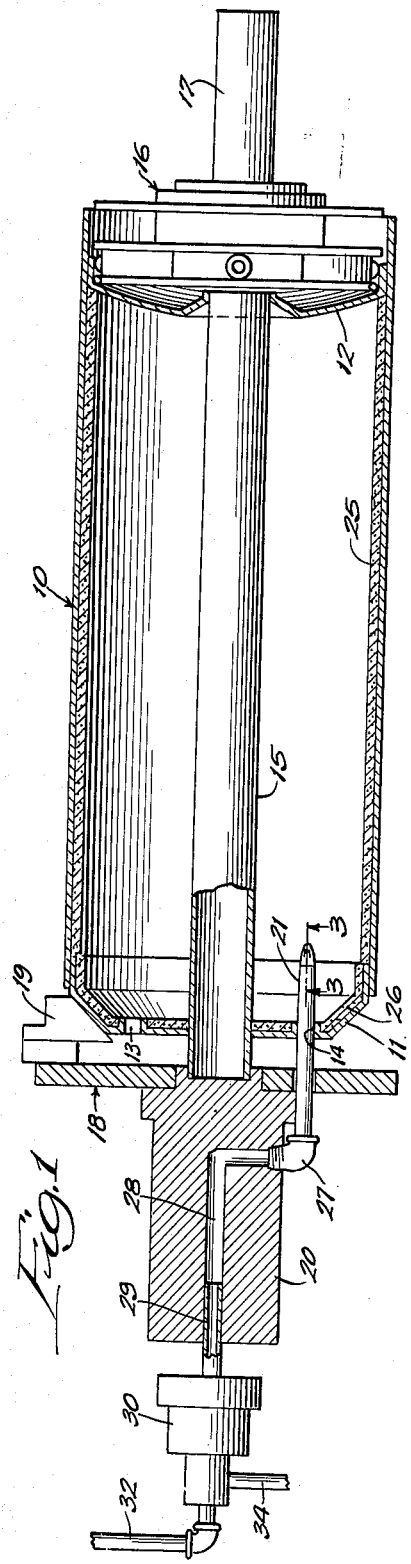
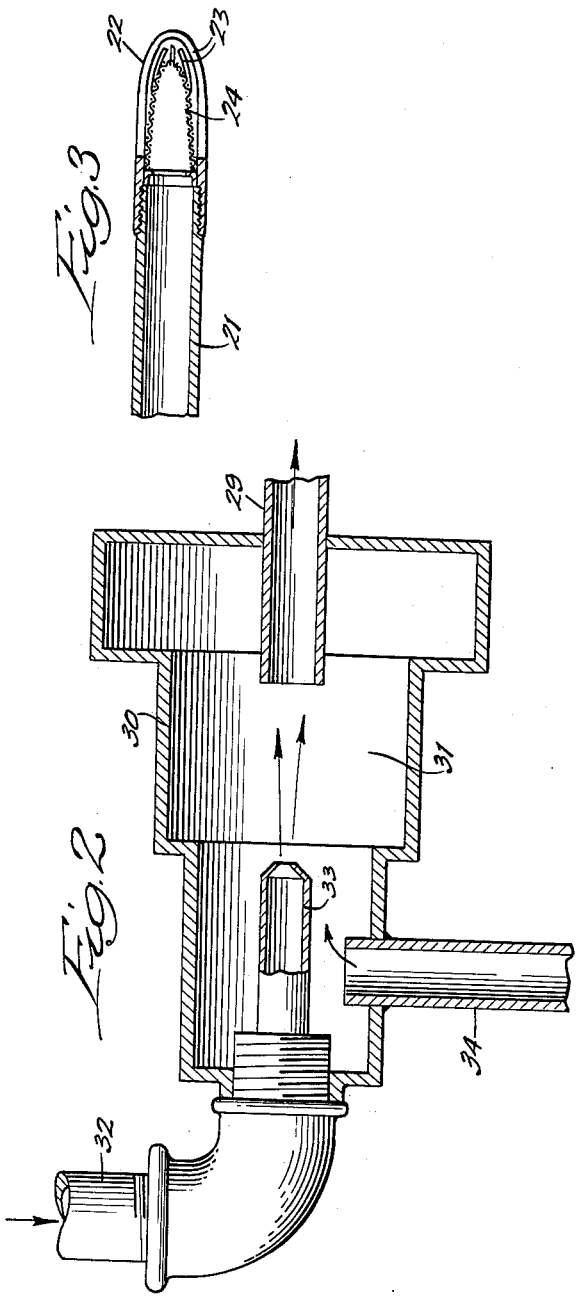
INVENTOR:
Arthur E. Phillips,
BY
Dawson Tilton & Graham,
ATTORNEYS.

2,730,463

ATOMIZING BONDERIZING OF CEMENT LINED TANK

Arthur E. Phillips, La Porte, Ind., assignor to The Coleman Company, Inc., Wichita, Kans., a corporation of Kansas Application June 24, 1953, Serial No. 363,843

3 Claims. (Cl. 117—96)

This invention relates to the atomizing bonderizing of a cement lined tank. The invention is particularly useful in the treatment of a cement lined tank for greatly reducing the curing time while at the same time forming an extremely sturdy lining for the tank.

It has heretofore been proposed that tanks be lined with cement for the various advantages that flow from such lining, and processes have been developed for supporting a tank, with the ends of the tank in position and for spinning the tank with cement therein to effect a uniform lining of the tank walls with cement. In this operation, the tank is secured within a fixture and the fixture provides bearings for engaging roller wheels so that the fixture may be rapidly rotated to throw the cement centrifugally against the walls of the tank and thus to line such walls. A liquid mixture of silicate of soda has been introduced into the tank, but such liquid tends to wash the cement off the walls and unsatisfactory results have been obtained. Some of the tanks treated by the prior processes have produced milky water after a period of time, such milky water being produced by a disintegration of the cement.

An object of the present invention is to provide a simple and effective method for cement lining tanks while at the same time fixing the cement quickly with a bonderizing agent without deleteriously affecting the inner surface of the lining as through spraying or washing, etc. Another object is to provide a method for effective seating of cement within a concrete lined tank while the tank is being rotated and through the application of a bonderizing agent in substantially mist form. Yet another object is to provide a process in which a tank may be lined with cement through centrifugal action while simultaneously providing silicate of soda or other bonderizing agent within the interior during the rotation of the tank to effect a bonderizing action and fixing action of the lining without impairing the lining in any manner. Other specific objects and advantages will appear as the specification proceeds.

The invention is shown, in an illustrative embodiment, by the accompanying drawing, in which—

Figure 1 is a longitudinal sectional view showing apparatus with which the process herein described may be employed; Fig. 2, an enlarged part sectional view of the mixing mechanism employed; and Fig. 3, a broken sectional view of the atomizing nozzle which may be employed.

In the illustration given, there is shown a tank 10 equipped at one end with a head 11 and at the other end with a bottom 12. The head 11 is provided with a pair of openings 13 and 14 and is centrally apertured to receive a flue pipe 15. The flue pipe 15 also extends through the bottom wall 12, as illustrated in Fig. 1. It will be understood that the specific tank shown is for the purpose of illustration, and that the invention shown herein is applicable to other types of tanks. At the bottom or right hand portion of the tank is shown a fixture 16 equipped with a trunnion 17 adapted to be received upon the wheels of a rotating machine. Since such structures are well known in the art, a detailed description herein is believed unnecessary.

The other end of the tank 10 is likewise supported by a fixture device 18, which may have a plurality of arms 19 engaging the sides of the head 11. The fixture is provided also with a trunnion 20 adapted to rotate upon the wheels of an ordinary rotating machine. The tank 10 supported upon the fixtures 16 and 18 may thus be rotated in a well known manner for the application of cement to the inner surfaces of the tank.

In the practice of my invention, I extend an atomizer pipe 21 within the opening 14 of the head 11, the pipe being equipped with an atomizer nozzle 22, as shown more clearly in Fig. 3. The nozzle is provided with a plurality of slots 23 and with a screen 24 therein. By discharging a bonderizing agent, such as silicate of soda and water, through the nozzle under air pressure, I am able to produce a very fine mist within the interior of the tank so that as the tank is spun the mist is applied to the surfaces of the lined tank. In the illustration given, 25 designates the lining of cement along the sides of the tank, while 26 designates a cement lining for the head of the tank. I also prefer to provide the bottom 12 and the pipe 15 with a very thin coating of cement (without any admixture of sand). The bottom 12 is preferably surfaced with porcelain, and the flue pipe 15 is similarly surfaced with porcelain. I have preferred to coat the porcelain surfaces of these members with a thin coating of cement prior to their being introduced into the assembled structure shown in Fig. 1. If desired, the coating cement layer may be moistened and allowed to set prior to the assembly operation.

In order to inject the atomized material into the tank 10 while it is being rotated, I employ the following apparatus. The pipe 21 extends rearwardly through the fixture 18 and thence is connected by the elbow 27 to the passage 28 within the trunnion 20. A fixed pipe 29 is supported within the conduit 28 and extends into a casing member 30, which provides a mixing chamber 31. Compressed air is introduced through pipe 32 and through the nozzle 33 into chamber 31, as shown more clearly in Fig. 2. A laterally-extending pipe 34 introduces the bonderizing fluid into the mixing chamber and about the pipe 33. The discharge air through pipe 33 and thence through pipe 29 gives a Venturi action and a thorough mixing of the bonderizing fluid with the air so that when the material is discharged through the atomizer nozzle 22, a fine mist is created which fills the chamber of the tank 10.

Any suitable bonderizing agent may be employed. For example, the mixture may consist of water in the proportion of 98% and silicate of soda 2%, these proportions being by weight. I prefer to employ warm water at about a temperature of 120° F. Since fluid bonderizing agents for mixing cement are well known, it is believed unnecessary to set out other specific examples.

Operation

In the operation of the device, the tank may be assembled in any desired manner, the head 11 being preferably lined preliminarily with concrete 26. Also, as heretofore stated, the porcelain-covered pipe 15 and bottom 12 may be provided with a layer of thin cement.

A quantity of cement desired for coating the inner walls of the tank 10 may be then introduced into the tank through one of the spud openings. Any suitable lining material may be used. As an example, one may use 22% of Portland cement, 63% of pure sifted sand, and 13% of water (preferably at 120° F.), these proportions being by weight. If desired, 2% silicate of soda may be used. After preparing a suitable mixture for introducing into the tank and after introducing the same into the tank, the tank assembly is placed upon the spinning machine and secured in position. It is then rotated at an R. P. M. that will result in a peripheral speed of 3,000 feet per minute for 15 seconds. After spinning the tank for 15 seconds, as described, I prefer to continue the spinning while vibrating the tank, as by hammering the outside walls of the tank. I then prefer to stop the rotation of the tank. The plug from the drain opening is removed and the water and sludge allowed to run off, and then the plug is replaced and the spinning drive started again. At this time I prefer to inject the atomized bonderizing fluid into the tank storage cavity while allowing the tank to rotate as described above for 10 seconds. After 10 seconds, the tank may again be hammered or vibrated for 10 seconds more as it is spinning, and then the spinning may be discontinued. The drain plug may again be removed and the residue drained off.

By means of the atomizing step described above, it is found that the bonderizing material is uniformly applied against the cement on the walls of the tank while exerting no washing action upon the material on the walls. The fine mist material penetrates the cement coating and gives an extremely quick setting. It is unnecessary to hold the tank stationary for a substantial period to permit setting. Within three minutes, the tank can be removed and handled upon a conveyor, etc. It is found that no washing of the aggregate or cement lining occurs and that the lining is uniform throughout. There is no tendency for the cement or aggregate to disintegrate and to form milky water during later use as a water storage tank.

While in the foregoing specification I have set forth a specific operation in considerable detail for the purpose of illustrating an embodiment of the invention, it will be understood that such details may be varied widely by those skilled in the art without departing from the spirit of my invention.

I claim:

1. In a process for cement-lining a tank, the steps of rotating the tank with aggregate, water and a hydraulic cement therein to apply the material centrifugally upon the interior surface of the tank, and introducing into the tank a fine mist consisting of silicate of soda and water while the tank is rotating.

2. In a process for cement-lining a tank, the steps of rotating the tank with aggregate, hydraulic cement and water therein to apply the mixture centrifugally upon the interior surface of the tank, draining water from the tank, introducing into the tank a fine mist consisting of silicate of soda and water, and rotating the tank to bring the interior thereof into contact with said mist.

3. In a process for cement-lining a tank, the steps of closing the ends of the tank, introducing through an opening in the tank a fluid mixture of aggregate, hydraulic cement and water, rotating the tank, stopping the rotation thereof, draining liquid from the tank, and then introducing into the tank a fine mist consisting of silicate of soda and water as the tank is rotated.

References Cited in the file of this patent

UNITED STATES PATENTS

| | | |
|---|---|---|
| 1,676,815 | Beatty | July 10, 1928 |
| 1,952,705 | Egloff | Mar. 27, 1934 |
| 2,241,493 | Van Thiel | May 13, 1941 |
| 2,395,731 | Ford | Feb. 26, 1946 |

FOREIGN PATENTS

| | | |
|---|---|---|
| 718 | Great Britain | of 1866 |